(12) United States Patent
Mangaiahgari

(10) Patent No.: US 9,471,300 B2
(45) Date of Patent: Oct. 18, 2016

(54) WIRELESS FIRMWARE UPGRADES TO AN ALARM SECURITY PANEL

(71) Applicant: UTC FIRE AND SECURITY AMERICAS CORPORATION, INC., Bradenton, FL (US)

(72) Inventor: Phani Pavan Kumar Mangaiahgari, Hyderabad (IN)

(73) Assignee: UTC FIRE AND SECURITY AMERICA CORPORATION, INC., Bradenton, FL (US)

( * ) Notice: Subject to any disclaimer, the term of this patent is extended or adjusted under 35 U.S.C. 154(b) by 0 days.

(21) Appl. No.: 14/416,183

(22) PCT Filed: Jul. 10, 2013

(86) PCT No.: PCT/US2013/049827
§ 371 (c)(1),
(2) Date: Jan. 21, 2015

(87) PCT Pub. No.: WO2014/018256
PCT Pub. Date: Jan. 30, 2014

(65) Prior Publication Data
US 2015/0220318 A1    Aug. 6, 2015

Related U.S. Application Data

(60) Provisional application No. 61/675,945, filed on Jul. 26, 2012.

(51) Int. Cl.
*G06F 9/44* (2006.01)
*G06F 9/445* (2006.01)
(Continued)

(52) U.S. Cl.
CPC . *G06F 8/65* (2013.01); *G06F 8/62* (2013.01); *H04L 67/10* (2013.01); *H04W 4/001* (2013.01)

(58) Field of Classification Search
CPC ........................................................ G06F 8/65
USPC ................ 717/169, 171, 172, 173
See application file for complete search history.

(56) References Cited

U.S. PATENT DOCUMENTS 6,493,871 B1 * 12/2002 McGuire et al. ............. 717/173
6,675,382 B1 *  1/2004 Foster .......................... 717/177
7,293,169 B1   11/2007 Righi et al.
(Continued)

FOREIGN PATENT DOCUMENTS

CN    201146523 Y    11/2008
CN    201203923 Y     3/2009
(Continued)

OTHER PUBLICATIONS

International Search Report for application PCT/US2013/049827, dated Sep. 23, 2013, 4 pages.
(Continued)

*Primary Examiner* — Phillip H Nguyen
(74) *Attorney, Agent, or Firm* — Cantor Colburn LLP

(57) ABSTRACT

A panel is described including stored data that is associated with the operation of the panel, and a server configured to provide a notification that an update to the data is available, the notification provided over a first communication network, and provide an update to the data via a wireless communication with the panel over a second communication network different than the first communication network.

20 Claims, 4 Drawing Sheets

(51) Int. Cl.
*H04W 4/00* (2009.01)
*H04L 29/08* (2006.01)

(56) References Cited

U.S. PATENT DOCUMENTS

| | | | |
|---|---|---|---|
| 7,330,109 | B2 | 2/2008 | Martin |
| 7,478,383 | B2 | 1/2009 | Shahindoust et al. |
| 7,480,907 | B1 | 1/2009 | Marolia et al. |
| 7,502,813 | B2 | 3/2009 | Ljung |
| 7,506,309 | B2 | 3/2009 | Schaefer |
| 7,512,939 | B2 | 3/2009 | Brookner |
| 7,583,197 | B2 | 9/2009 | Wesby Van Swaay |
| 7,667,596 | B2 | 2/2010 | Ozdemir et al. |
| 7,689,984 | B2 | 3/2010 | Riley |
| 7,907,753 | B2 | 3/2011 | Wilson et al. |
| 8,077,026 | B2 | 12/2011 | Jobe et al. |
| 8,094,010 | B2 | 1/2012 | Wesby-Van Swaay |
| 8,132,015 | B1* | 3/2012 | Wyatt ............ 713/176 |
| 8,214,494 | B1* | 7/2012 | Slavin ............ G08B 25/08 709/203 |
| 8,560,823 | B1* | 10/2013 | Aytek et al. ............ 713/2 |
| 8,893,110 | B2* | 11/2014 | Kapadekar ............ G06F 8/65 717/171 |
| 9,026,648 | B1* | 5/2015 | Slavin ............ 709/224 |
| 2003/0233429 | A1 | 12/2003 | Matte et al. |
| 2004/0059703 | A1* | 3/2004 | Chappell et al. ............ 707/1 |
| 2004/0215755 | A1* | 10/2004 | O'Neill ............ 709/223 |
| 2005/0055595 | A1 | 3/2005 | Frazer et al. |
| 2005/0132348 | A1* | 6/2005 | Meulemans et al. ............ 717/168 |
| 2005/0143863 | A1* | 6/2005 | Ruane ............ G05B 19/042 700/276 |
| 2006/0161750 | A1* | 7/2006 | Perkins et al. ............ 711/164 |
| 2006/0271695 | A1 | 11/2006 | Lavian |
| 2006/0282896 | A1* | 12/2006 | Qi ............ G06F 21/57 726/25 |
| 2007/0078957 | A1* | 4/2007 | Ypya et al. ............ 709/222 |
| 2007/0112943 | A1* | 5/2007 | Fisher et al. ............ 709/220 |
| 2007/0113265 | A2 | 5/2007 | Oliphant |
| 2007/0130184 | A1* | 6/2007 | Hogg ............ G06F 9/44505 |
| 2008/0122575 | A1 | 5/2008 | Lavian et al. |
| 2008/0127159 | A1 | 5/2008 | Regenmorter |
| 2009/0075641 | A1 | 3/2009 | Guven |
| 2009/0248967 | A1* | 10/2009 | Sharma ............ G06F 9/44505 711/103 |
| 2009/0300595 | A1 | 12/2009 | Moran et al. |
| 2009/0318124 | A1 | 12/2009 | Haughn |
| 2010/0169876 | A1 | 7/2010 | Mann |
| 2010/0205650 | A1 | 8/2010 | Terry |
| 2011/0012726 | A1 | 1/2011 | Jessiman et al. |
| 2011/0102171 | A1* | 5/2011 | Raji ............ G06F 17/30873 340/539.11 |
| 2011/0138377 | A1 | 6/2011 | Allen |
| 2012/0060151 | A1* | 3/2012 | Oh ............ H04L 12/2814 717/170 |
| 2012/0088474 | A1 | 4/2012 | Wesby-Van Swaay |
| 2012/0170569 | A1* | 7/2012 | Al-Khudairi ............ 370/346 |
| 2013/0179625 | A1* | 7/2013 | Stanton ............ G08B 29/16 711/103 |

FOREIGN PATENT DOCUMENTS

| | | |
|---|---|---|
| CN | 201690520 U | 12/2010 |
| EP | 2109041 A1 | 10/2009 |
| GB | 2432930 A | 6/2007 |
| JP | 2004265153 A | 9/2004 |
| JP | 2008262454 A | 10/2008 |
| WO | 9957646 A1 | 11/1999 |
| WO | 0036503 A2 | 6/2000 |
| WO | 2010023339 A1 | 3/2010 |
| WO | 2010046939 A1 | 4/2010 |
| WO | 2011040754 A2 | 4/2011 |

OTHER PUBLICATIONS

Written Opinion for application PCT/US2013/049827, dated Sep. 23, 2013, 6 pages.

* cited by examiner

WIRELESS FIRMWARE UPGRADES TO AN ALARM SECURITY PANEL

BACKGROUND

Panels, such as residential intrusion or fire alarm security panels, may be configured to support wireless communications. Manufacturers and suppliers of the panels may service a large number of users (e.g., a large number of customer accounts) at geographically dispersed locations. Accordingly, the manufacturers/suppliers may incur large expenses in terms of providing support for the panels.

One type of support activity involves updating a panel. For example, a panel might be updated if a new feature becomes available or if a preexisting feature is replaced or upgraded. Manually updating the panel may represent a burden to the manufacturer/supplier in terms of time, labor, and/or additional costs. Such additional costs may include the time needed to test the new feature, potentially in combination with the rest of the features of the panel. The additional costs may include errors resulting from human error, e.g., operator or technician mistakes. In some embodiments, the errors may expose the panel to potential damage. The additional costs may include the cost of transmitting the new feature to the panel. For example, a network provider may impose a charge based on the time a communication channel is occupied and/or based on a quantity or volume of data transmitted via the channel. If the panel polls the manufacturer's or supplier's platform (e.g., a server computer) for any potential updates, the channel might be occupied unnecessarily by the polling requests if the updates are infrequent. Furthermore, if the communication channel is unreliable, one or more portions of a download operation may need to be repeated, thereby increasing the time that the channel is occupied.

BRIEF SUMMARY

An embodiment of the disclosure is directed to a system comprising a panel including stored data that is associated with the operation of the panel, and a server configured to provide a notification that an update to the data is available, the notification provided over a first communication network, and provide an update to the data via a wireless communication with the panel over a second communication network different than the first communication network.

An embodiment of the disclosure is directed to a panel for fire or intrusion detection comprising at least one processor, and memory storing instructions that, when executed by the at least one processor, cause the panel to store data that is associated with the operation of the panel, receive a notification via a first communication network that an update to the data is available, and receive an update to the data via a wireless communication over a second communication network different than the first communication network.

An embodiment of the disclosure is directed to an apparatus comprising at least one processor, and memory storing instructions that, when executed by the at least one processor, cause the apparatus to provide a notification via a first communication network that an update to data associated with the operation of a panel is available, and provide an update to the data via a wireless communication with the panel over a second communication network different than the first communication network.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
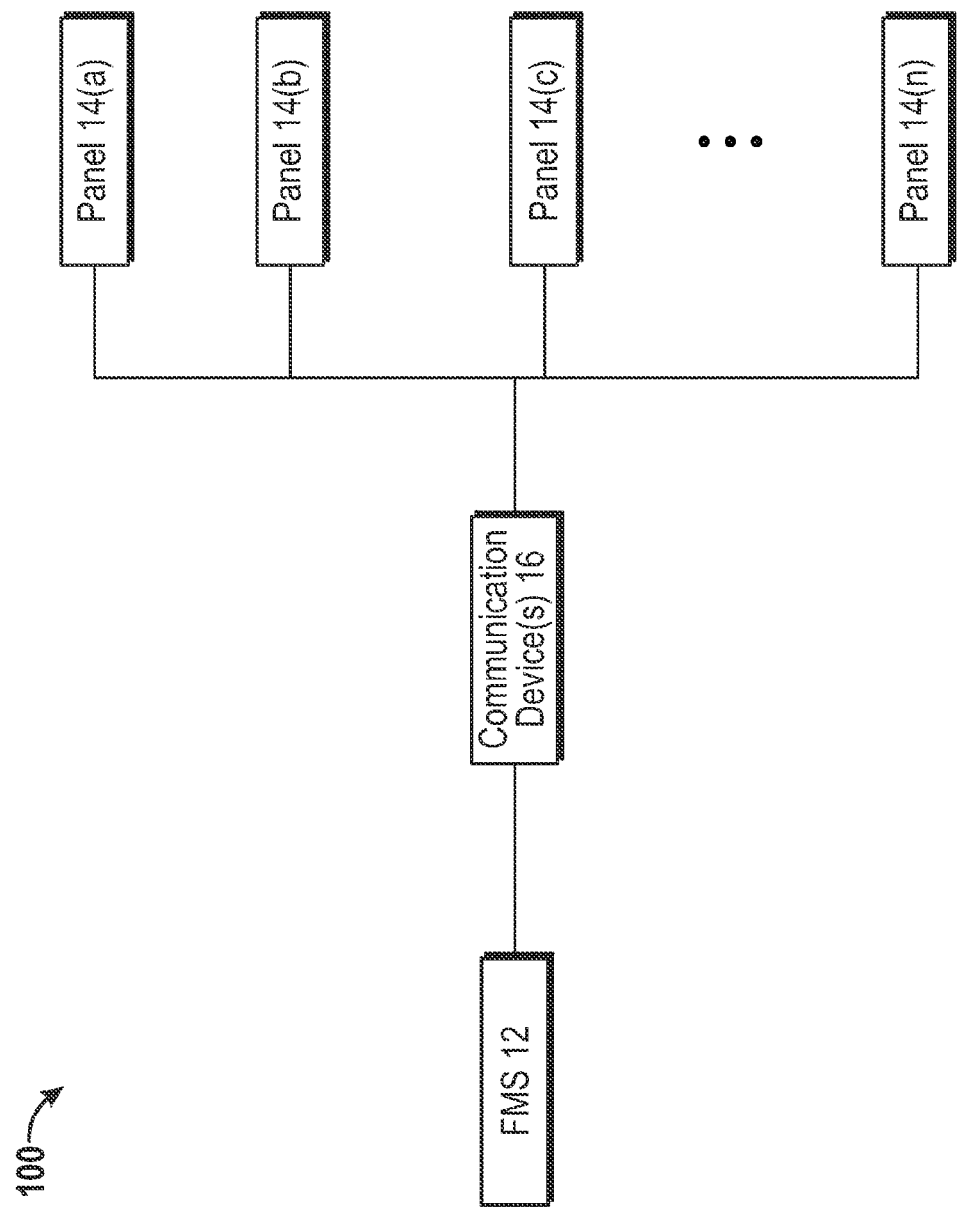
FIG. 1 illustrates an exemplary architecture in accordance with one or more aspects of this disclosure.

Exemplary embodiments of apparatuses, systems and methods are described for delivering one or more updates to an entity. In some embodiments, the update may correspond to a replacement, an upgrade, or a new feature. An update may be provided to a panel. The update may be provided via wireless communications. In some embodiments, automatic, error free, and/or optimized updates may be provided, and savings in terms of cost, effort, and/or labor may be realized by manufacturers/suppliers and users (e.g., customers).

In some embodiments, messaging (e.g., a short message service (SMS) communication) may be used to notify a panel of an update. The panel might only connect to a manufacturer's or supplier's server (e.g., a firmware management server (FMS), etc.) when an update specific to the panel is available. Thus, costs associated with polling may be reduced or eliminated.

In some embodiments, a FMS may be or include server side software that may manage all, or a subset of, firmware updates. The FMS may act as a repository of firmware updates (e.g., patches, operating system updates, full image, new features etc). In some embodiments, a database/repository of all or a subset of a list of panels in the field may be maintained in the server (e.g., in the FMS). Information such as panel identifier, communication credentials (MSISDN and/or IP address and/or DSN name and/or PSTN phone number), panel type, last known firmware details of the panel, etc., may be stored in the repository for one or more panels. In some embodiments, the FMS either hosts or has access to this database/repository. A firmware update may contain one or more files (binary/text files, raw binary flash image(s), scripts, etc.), a configuration file, or any other information.

Embodiments of the disclosure may eliminate a need for repeated download operations when a prior download fails. For example, a download might fail in response to a connection breakdown, channel issues or problems, or based on any other condition. In some embodiments, a download may resume from a point in which the download failed. Thus, network provider costs/charges may be minimized.

Embodiments of the disclosure may support download operations via "push" and/or "pull" mechanisms. For example, a manufacturer/supplier's server may initiate a download operation (e.g., a "push" operation). Similarly, a panel may initiate a download operation (e.g., a "pull" operation).

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

FIG. 1 illustrates a system architecture 100 in an exemplary embodiment. The architecture 100 may be included as a part of a network, such as a data or cellular communication network. The network may be operative in accordance with one or more communication techniques, protocols, standards, or the like. For example, the network may operate in accordance with a general packet radio service (GPRS) for global system for mobile communications (GSM). In some embodiments, secure communications may be conducted. For example, hypertext transfer protocol secure (HTTPS) may be used in some embodiments.

The architecture 100 may include one or more devices configured to communicate one or more updates, such as firmware updates. For example, the architecture 100 may include a FMS 12 and a number 'n' of panels 14a-14n. The FMS 12 may be associated with a manufacturer or a supplier of one or more of the panels 14. The FMS 12 may store firmware used by, or installed on, one or more the panels 14. In some embodiments, the FMS 12 may store one or more versions of the firmware. For example, the FMS 12 may store a baseline version of the firmware and one or more updates to the baseline version. The update(s) may be based on the introduction of a new design feature or may be used to remedy a (latent) design bug, for example.

In some embodiments, the panels 14a-14n may be of the same type (e.g., the same make or model number). In some embodiments, a subset of the panels (e.g., panels 14a-14b) may be of a first type, and the remainder of the panels (14c-14n) may be of a second or additional type(s).

In some embodiments, the panels 14a-14n may be located at a common location. For example, the panels 14a-14n may be located in a building, where the panel 14a may be located in a first room of the building, the panel 14b may be located in a second room of the building, etc. In some embodiments, the panels 14a-14n may be located in geographically dispersed locations. For example, the panel 14a may be located in a first building in a first country, the panels 14b-14c may be located in a second building in a second country, etc. Thus, a panel (e.g., the panel 14a) may be remotely located from one or more of the other panels (e.g., the panels 14b-14n).

The panels 14 may be configured to provide any number of functions or features. For example, the panels 14 may be used to provide for detection, such as intrusion, fire, and sound detection. The panels 14 may include one or more interfaces, such as a user interface (e.g., a graphical user interface) configured to receive user inputs or selections and/or provide output status. One or more interfaces may be used to provide for interactive features, such as applications related to weather, sports, news, stocks, etc.

The architecture 100 may include one or more communication devices 16. The communication devices 16 may include one or more wireless/wired modems, switches, routers, access points, towers, antennas, transceivers, cables, wires, or any other piece of equipment that may be used to couple (e.g., communicatively couple) the FMS 12 and the panels 14. In some embodiments, the FMS 12 and the panels 14 may communicate with one another via one or more networks. In some embodiments, a service provider may provide one or more services (e.g., one or more web services) to facilitate communication between FMS 12 and one or more panels 14.

The architecture 100 is illustrative. In some embodiments, one or more of the devices shown in FIG. 1 may be optional.

For example, in some embodiments the FMS 12 may communicate directly with the panels 14, such that the communication device(s) 16 might not be included (or may be subsumed in the FMS 12 and/or the panels 14). In some embodiments, additional devices not shown in FIG. 1 may be included. In some embodiments, the architecture 100 may be arranged different from what is shown in FIG. 1.

Figure 2:
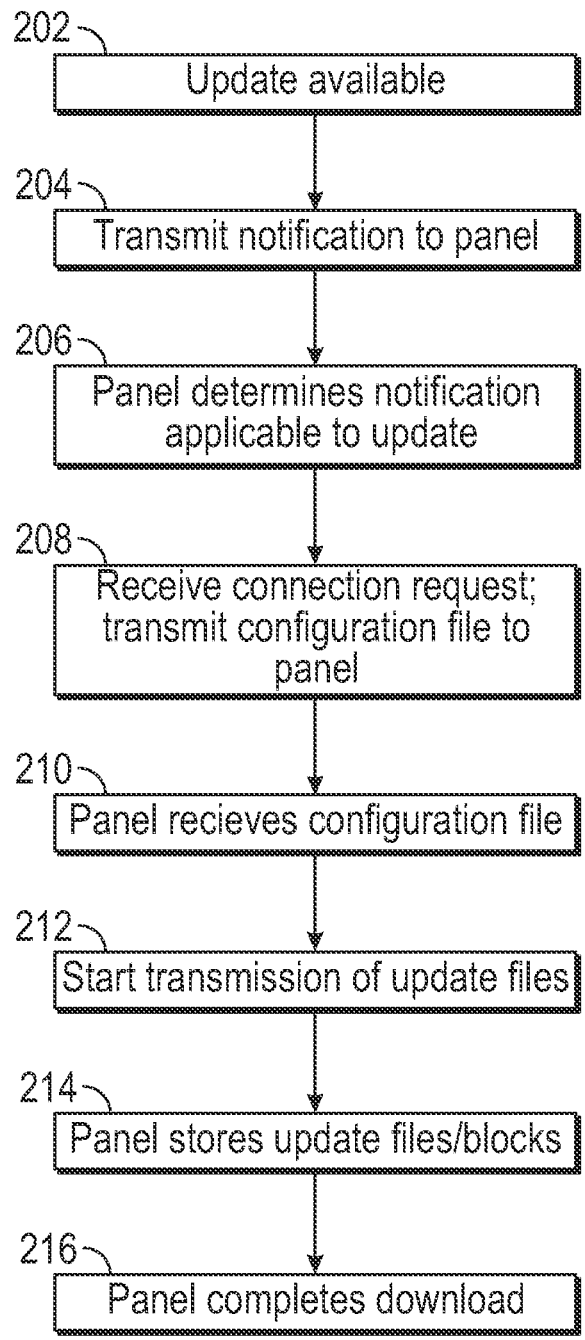
FIG. 2 illustrate an exemplary method in accordance with one or more aspects of this disclosure.

FIG. 2 illustrates a method in accordance with one or more aspects of this disclosure. The method of FIG. 2 may execute in conjunction with one or more devices or architectures, such as those described herein. The method of FIG. 2 may be used to communicate an update, such as a firmware update from a server (e.g., the FMS 12 of FIG. 1) to a panel (e.g., one or more of the panels 14 of FIG. 1).

In step 202, an update may be made available. For example, personnel or a device associated with a manufacturer or a supplier of a panel may provide an update to a version of firmware associated with the panel. As part of step 202, the personnel may store the update to a server that may be communicatively coupled to the panel.

In step 204, the server may transmit a notification to the panel. The notification may take the form of a message, such as a short messaging service (SMS) message. In some embodiments, the server may respond to a ping with respect to an update. One or more panels may support two-way voice, where a monitoring station may place a call to a panel when there is an alarm. A user (e.g., a customer) may pick up the voice call on the panel, talk to monitoring station personnel to confirm/reject the alarm. One or more of the panels may have a PSTN modem. One or more of the panels may have a GSM modem. One or more modems may support voice calls. In some embodiments, a "voice ring" may be used as a notification to a panel. The panel, once it receives a predefined number of voice rings from a given source, may interpret the rings as a notification, and may connect to the server to initiate the upgrades. In some embodiments, the notification may be specifically targeted to the panel. For example, an addressing scheme may be used such that the notification is (only) received by those panels that are the subject of the update, such as those panels that are of a particular make or model, panels at particular location/facility, particular user(s) or customer(s), etc. Alternatively, the notification may be transmitted to a pool or group of panels (using a broadcast technique, for example) and the notification may include an identification of the type of panel that the update is applicable to (optionally on the basis of a make or model number), such that a receiving panel may determine whether to act on (e.g., download) the update.

The notification may optionally carry the server (e.g., FMS) address details. This may be needed if, for example, the server address has changed, the panels are now handed over/migrated to a different manufacturer, etc. A panel may authenticate (using SSL certificates) and configure the new server address details and may contact the server regarding a new address for updates. In step 206, the panel may receive the notification and determine that the notification is applicable to an update of the panel's firmware. In response to determining that the notification comprises an update request, the panel may initiate a connection to the server. For example, the panel may initiate a TCP/IP connection over a wireless data channel (ex: GPRS/Edge/3G/4G etc) to the server. First the panel may check if a wired channel is available and if it is active. If available and active, the panel may use the wired channel. Otherwise, the panel may communicate over the wireless channel.

In step 208, the server may receive the connection request from the panel. The server may authenticate the panel and transmit a configuration file to the panel.

In step 210, the panel may receive the configuration file. The configuration file may include one or more pieces of information, such as a name and/or identification number for the update, an identification of the type of update (e.g., a patch update or a full image update as described below), the number of files (e.g., binaries, executable files, libraries, etc.) to be downloaded, whether the file is compressed or not, the size and hash of each of the files, and if a patch update, the location of where the file has to be placed or replaced on the panel (e.g., an identification of where in memory to store the file).

In step 212, the server may start to transmit the file(s) to be downloaded corresponding to the update. In some embodiments, the file(s) may be transmitted as one or more blocks or fragments.

In step 214, the panel may store (e.g., in a temporary storage) the block(s) or file(s) transmitted by the server and received by the panel.

In step 216, the panel may complete the download of the file(s)/block(s). The panel may decompress the file if a compressed update is downloaded. As part of step 216, the panel may verify the hash for the files downloaded. The panel may copy the data from temporary storage and place the data in permanent storage locations (as potentially specified in the configuration file). The panel may, if the update corresponds to a full image update, restart the panel so that the image is programmed automatically by one or more boot up scripts. The panel may, if the update corresponds to a patch update, restart a module associated with the patch. The panel may transmit an acknowledgment to the server to provide a status regarding the receipt of the update or installation of the update on the panel. The panel may terminate any open connection to the server.

As described above, in some embodiments an update may correspond to a patch update or a full image update. Patch updates may involve an update to a single file or a limited number of files. A full image update may serve to replace all or a large number of the files at the panel. The panel may optionally have flash memory partitions. Full image update may rewrite a one or more partitions with a raw binary image.

The method as shown in FIG. 2 may be used in connection with "push" operations, wherein the download operation may be initiated by the server via the transmission of the notification in step 204. In some embodiments, a "pull" operation may be realized wherein the download operation may be initiated by the panel. In the "pull" operation embodiments, the server might not transmit the notification of step 204.

The method of FIG. 2 is illustrative. In some embodiments, one or more of the steps (or portions thereof) may be optional. In some embodiments, one or more additional steps not shown may be included. In some embodiments, the steps may execute in an order or sequence different from what is shown.

In some embodiments, a channel used to communicate updates from the server to the panel might be unreliable. For example, socket connections might not be guaranteed to be alive for long enough to complete a download operation from the server to the panel from start to finish. In order to accommodate an update with an unreliable channel, a panel may re-connect to a server (or other distribution device) responsive to a connection being dropped or prematurely terminated.

Figure 3:
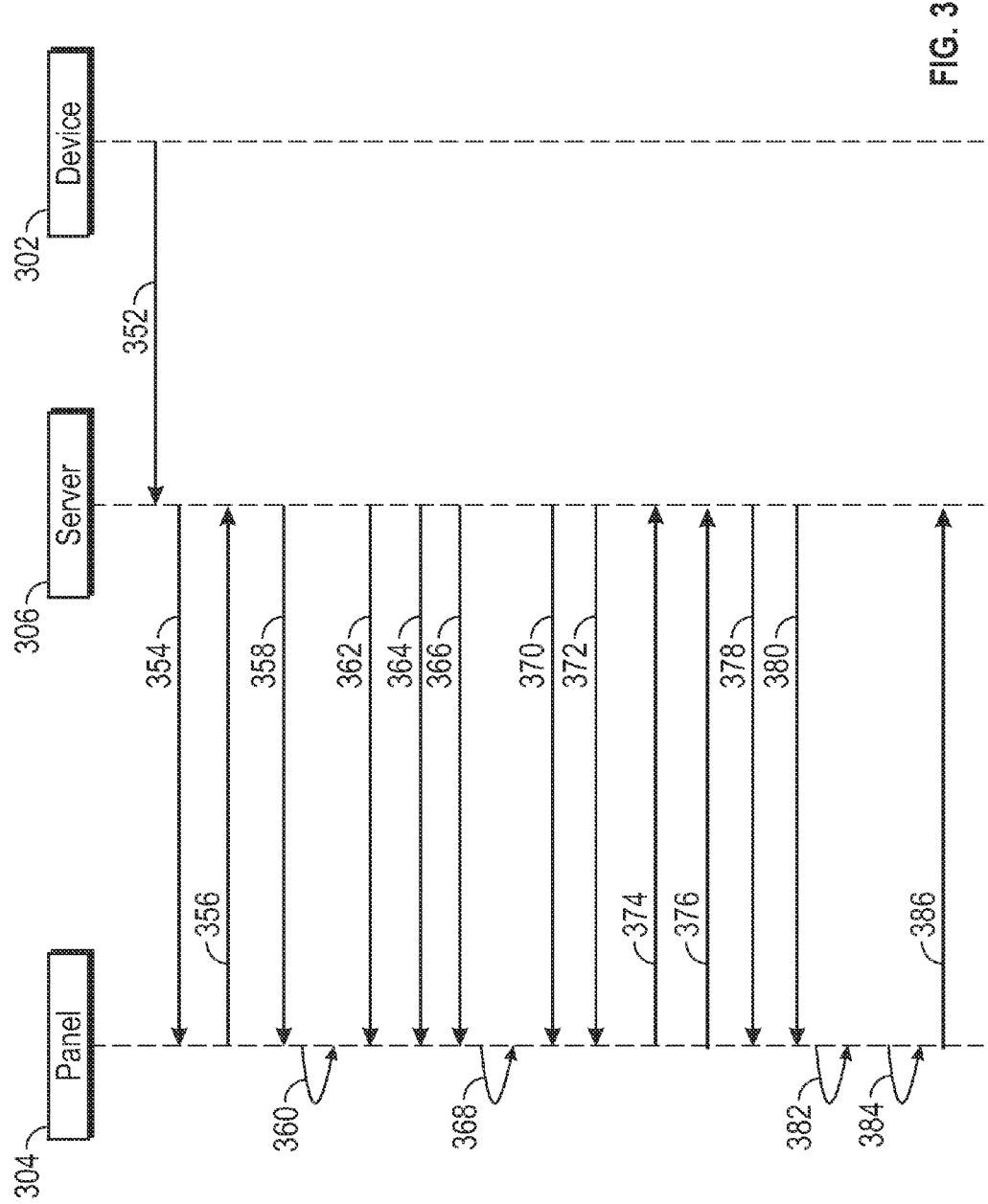
FIG. 3 illustrates an exemplary flowchart for downloading an update in accordance with one or more aspects of this disclosure.

FIG. 3 illustrates a flowchart for re-connecting a panel and a server. As shown in FIG. 3, a device 302 in step 352 may assign an update to a panel 304, or to an account associated with the panel 304. The assigned update may be provided to a server 306. In some embodiments, the panel 304 may correspond to one or more of the panels 14 of FIG. 1. In some embodiments, the server 306 may correspond to the FMS 12 of FIG. 1.

In some embodiments, the device 302 may be associated with a server administrator or a dealer administrator that logs-in to the server 306 to engage in one or more activities, such as planning, configuration, initiating, or uploading an update.

In step 354, the server 306 may transmit a notification to the panel 304 to advise that the update is available.

In step 356, the panel 304 may establish a connection to the server 306 responsive to the notification of step 354. The panel 304 may indicate that this is a new connection request as part of step 356.

In step 358, the server 306 may transmit, and the panel 304 may download, a configuration file corresponding to the update.

In step 360, the panel may parse the configuration file and plan for and prepare to download one or more files or blocks corresponding to the update.

In step 362, a first block (block 1) associated with a first file (file 1) of the update may be downloaded from the server 306 by the panel 304.

In step 364, a second block (block 2) associated with the first file (file 1) of the update may be downloaded from the server 306 by the panel 304.

In step 366, an '$n^{th}$' block (block 'n') associated with the first file (file 1) of the update may be downloaded from the server 306 by the panel 304, where 'n' may correspond to the number of blocks in the first file (file 1) of the update.

In step 368, the panel 304 may validate the first file (file 1) of the update. The validation may be based on information specified in the configuration file associated with steps 358 and 360. A status regarding the validation activity with respect to the first file (file 1) may be transmitted from the panel 304 to another entity (e.g., the server 306) in some embodiments (not shown in FIG. 3).

In step 370, a first block (block 1) associated with a second file (file 2) of the update may be downloaded from the server 306 by the panel 304. In some embodiments, the transmission of the first block (block 1) of the second file (file 2) from the server 306 in step 370 may be conditioned on receiving a status or acknowledgment from the panel 304 in step 368. Such conditioning may be used to accommodate panels of variable processing capabilities or panels subject to different processing loads (e.g., the time to process or validate a file may vary in comparing a first panel to a second panel).

In step 372, a second block (block 2) associated with the second file (file 2) of the update may be downloaded from the server 306 by the panel 304.

Following the download of the second block (block 2) of the second file (file 2) of the update, the connection (e.g., the connection of step 356) between the panel 304 and the server 306 may be lost. In response to losing the connection, the panel 304 may re-establish the connection with the server in step 374. The panel 304 may indicate to the server 306 that this is a request to re-establish a prior connection in step 374.

In step 376, the panel 304 may provide a download status to the server 306. For example, the panel 304 may transmit an identification associated with the update (e.g., a name or number of the update) and indicate to the server 306 that the connection was lost following a completion of the download of the second block (block 2) of the second file (file 2) of the update.

In step 378, the server 306 may provide a third block (block 3) associated with the second file (file 2) of the update for download by the panel 304, responsive to the status that the server 306 received in relation to step 376.

In step 380, an 'm$^{th}$' block (block 'm') associated with the second file (file 2) of the update may be downloaded from the server 306 by the panel 304, where 'm' may correspond to the number of blocks in the second file (file 2) of the update.

In step 382, the panel 304 may validate the second file (file 2) of the update. The validation may be based on information specified in the configuration file associated with steps 358 and 360. A status regarding the validation activity may be transmitted from the panel 304 to another entity (e.g., the server 306) in some embodiments (not shown in FIG. 3).

Assuming that additional files are associated with the update, the progression described above in connection with FIG. 3 may continue for each (block of the) file in terms of download and validation.

Once all the files are received and validated, the files may be moved or copied from a temporary storage location (e.g., a cache) to permanent storage locations in the panel 304 in step 384. Waiting until all the files are received and validated prior to placing the files in the permanent storage locations may help to prevent inoperability of the panel 304 in the event that one or more of the files (e.g., file 2) are not successfully received (e.g., in the event that one or more of the files are not received, or the data of the one or more files are not what was expected).

Alternatively, in some embodiments, a file may be placed in a permanent storage location once that file is received (and, in some embodiments, validated). Such placement may be used where the panel 304's temporary storage capacity is small relative to the size of the file(s) being downloaded, or where the file(s) are independent of one another in terms of their function or operation.

In step 386, the panel 304 may terminate the connection to the server 306. As part of step 386, the panel 304 may perform any other activity responsive to having completed the download of the update. For example, the panel 304 may be restarted or re-booted, or a portion or module of a program or code executing on the panel 304 may be restarted. After a successful restart, the panel 304 may contact the server 306 and acknowledge the update. The server 306 may update the status in the repository accordingly. If for any reason, the update failed (e.g., the server 306 did not receive the acknowledgment from the panel 304), server 306 may notify an administrator about the failure. The server 306 may provide a list of failed updates to the administrator or a dealer on demand. The dealer may take/plan further actions.

The flowchart of FIG. 3 is illustrative. In some embodiments, one or more of the steps (or portions thereof) may be optional. In some embodiments, one or more additional steps not shown may be included. In some embodiments, the steps may execute in an order or sequence different from what is shown. For example, a connection loss may occur more or less than once during the download of an update. A request to re-establish the connection may be transmitted by the panel in response to such connection losses.

Embodiments of the disclosure may provide an automated (e.g., a fully automated), intelligent, self-installable firmware management framework for a next generation panel. In some embodiments, the framework may address complexities involved in firmware installation, rollback, upgrade, or downgrade activities. In some embodiments, the activities may be isolated from the core panel firmware. As a result, in some embodiments a reduction in firmware development efforts may be realized. In some embodiments, a better or more efficient management of firmware on both a panel and a distribution device (e.g., a server) may be realized.

Embodiments of the disclosure may enable interactive and/or advanced features to be operative on a panel. For example, video, interactive web content, and home automation features may be present on a panel, potentially in addition to pure residential or commercial security features.

In order to facilitate the additional features, a layered architecture may be used. For example, the layered architecture may include one or more layers. A layer may be based on one or more technologies and may include one or more firmware modules. In some embodiments, a secure self-installable package may enable a firmware, application, or feature update (e.g., install, uninstall, upgrade, downgrade) on a panel. A so-called "light weight package management system/software" (LWPMS) on a panel platform may support updates (e.g., firmware updates) and configuration management (e.g., add/remove programs). A backend to a server (e.g., a FMS) may manage firmware, application, or feature releases in the form of self-installable packages. The server may be configured to provide remote and local updates (e.g., firmware upgrades) to one or more panels.

In some embodiments, package updates may be performed or provided for firmware modules. An embedded system may include memory partitions, such as flash memory partitions. Using packages and/or the LWPMS, a new image may be written or rewritten to one or more of the partitions. As such, firmware modules (e.g., a set of files, folders, etc.) and/or one or more memory partition images may be updated.

In some embodiments, a backend (e.g., a backend to a server) may obtain information regarding updates or patches that are added to a product or service. For example, a very fine resolution may be obtained regarding what a package update did to a product or system. In some embodiments, such information may include an identification of the folder where a package has performed an update. In some embodiments, a package manager may be queried to obtain information about one or more package updates that may have been performed. The package manager may provide details regarding one or more files or folders that have been created or updated, date-time-version dependencies, etc. The package manager may return the information or details responsive to the query.

As described further below, in some embodiments a package may be removed, uninstalled, upgraded, or downgraded.

In some embodiments, an update (e.g., an upgrade) may involve one or more activities. Such activities may include one or more of: verifying a version of an existing firmware resource and updating one or more installation plans or scripts, verifying and optionally installing dependencies (e.g., dependent libraries), creating or replacing binary files (e.g., executables or libraries), creating/editing/replacing configuration files or other supporting files, executing scripts (e.g., database scripts, operating system scripts, etc.), notifying existing firmware processes running in a system, cleanup activities, updating versions and restarting systems, processes or other entities, etc.

In some embodiments, the foregoing activities may be associated with an automated self-installable package or update. The update may support installation as a single unit. In some embodiments, intelligence regarding the update may be included in the update, such that existing firmware (e.g., alarm or security related firmware) on a panel might not need to know or be concerned with the details of the installation steps or procedures. The existing firmware might not need to address or manage shared library conflicts during installation. In some embodiments, if an update fails, a "rollback" to the prior version may be automatically provided for. In some embodiments, the update may provide support for future operating system extensions or plug-in installations. In some embodiments, a server (e.g., a FMS) may provide support for remote and local updates to panels in the field. In some embodiments, when an update becomes available a notification may be sent to one or more panels. In some embodiments, the notification or receipt of an update by a panel may be conditioned on whether a user or customer associated with the panel has paid for or subscribed to a given service. In some embodiments, an update operation might not mandate a system downtime or restart during installation or uninstallation. System downtime or restart may occur on an "as-needed" basis. In some embodiments, an update process or procedure may be resistant to cloning or hacking practices.

Figure 4:
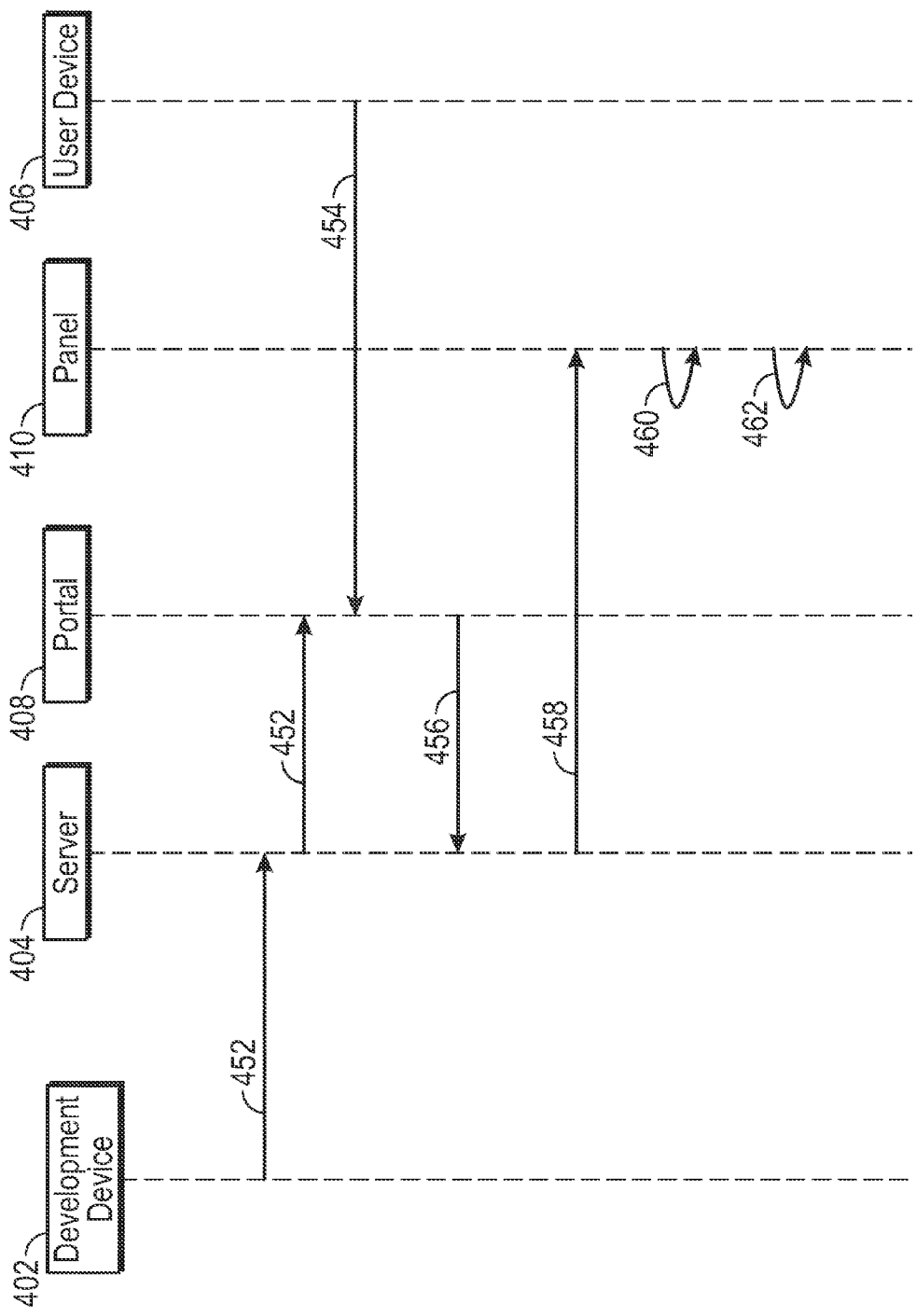
FIG. 4 illustrates an exemplary flowchart for providing, receiving, and installing an update in accordance with one or more aspects of this disclosure.

FIG. 4 illustrates a flowchart for providing, receiving, and installing an update. In connection with the flowchart of FIG. 4, a development device 402, a server 404 (e.g., a FMS), a user device 406, a portal 408, and a panel 410 are described below. In some embodiments, one or more of these entities may be optional. In some embodiments, two or more of the entities may be combined in a common housing or casing. In some embodiments, one or more entities not shown may be included.

In step 452, the development device 402 may provide or upload an update to the server 404. The update may be provided as one or more packages. The package(s) may be formatted in accordance with a format prescribed by the LWPMS. The package(s) may be digitally signed. In some embodiments, an engineer, a developer, etc., may test and verify the update via the development device 402 (or via another device). Responsive to receiving the update, the server 404 may store or save the update as part of step 452. As part of step 452, the server 404 may advise the portal 408 of the existence of the update.

In step 454, the portal 408 may receive a request for the update from the user device 406. As part of step 454, the user device 406 may initiate a purchase or acquisition of the update. A user (e.g., a customer) associated with the user device 406 may browse the portal 408 to identify or locate the update. In some embodiments, the user device 406 may be, or include, the panel 410. In some embodiments, the user device 406 may be, or include, a personal computer, a laptop, a mobile device (e.g., a smartphone), etc.

In step 456, the portal 408 may transmit to the server 404 information related to a selection of the update by the user device 406 in connection with step 454. The information may include an identification of the user and/or user device 406, an identification of the update, an identification of the panel 410, or any other information that may be used by the server 404 to provide the update to the panel 410. The portal 408 may make an entry into a database associated with the server 404. The entry may ensure that the update is associated with or made available to the panel 410 associated with the user or user device 406.

In step 458, the server 404 may prepare a license file. The license file may associate the update to the panel 410. A bundle or tar file may be prepared, which may include one or more of: the package or update and a license configured to ensure that the package/update only works on an authentic panel. The server 404 may send a notification (e.g., an SMS message) to the panel 410 to advise the panel 410 that the update is available. Responsive to receiving the notification, the panel 410 may connect to the server 404 and download the update. As part of the download, the panel 410 may download a hash (e.g., an MD5 hash) from the server 404.

In step 460, the panel 410 (or firmware associated with the panel 410) may compute a hash of the download and compare the computed hash to the downloaded hash. If the computed hash and the downloaded hash do not match, the panel 410 may terminate the download operation, as the lack of a match may be indicative of an update that has been corrupted or tampered with. Assuming that a match exists between the hashes, the panel 410 may extract the bundle and validate the license with a "license manager" module. Once the license is validated, the panel 410 may allow the LWPMS to install the update.

In step 462, the LWPMS may manage one or more operations, such as install, uninstall, rollback, upgrade, downgrade, verify dependencies, optionally download dependencies, execute scripts, etc. In some embodiments, the LWPMS, optionally in combination with package scripts, may perform one or more of the aforementioned activities.

The flowchart of FIG. 4 is illustrative. In some embodiments, one or more of the steps (or portions thereof) may be optional. In some embodiments, one or more additional steps not shown may be included. In some embodiments, the steps may execute in an order or sequence different from what is shown.

Embodiments have been described in terms of the control and management of firmware used in a panel. One skilled in the art will appreciate that embodiments may be adapted to accommodate different types of environments. For example, the embodiments may be adapted to accommodate any environment associated with the management and distribution of data. Such data may be associated with an application, an operating system, business processes, core firmware modules, etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Embodiments may be tied to one or more particular machines. For example, a server may store firmware associated with a panel's functionality or operation. The firmware may be stored as one or more versions, such as a baseline version and one or more updates to the baseline version. The one or more updates may be automatically communicated from the server to the panel. In some embodiments, the communication may occur wirelessly or via a wired solution. The panel may compare a downloaded update with a configuration file, using a hash algorithm, to validate that the download is complete and that one or more file(s) of the update were not corrupted or tampered with.

Embodiments may transform an article into a different state or thing. For example, costly manual panel updates or procedures may be replaced by automatic panel updates or procedures. In this manner, reliability may be enhanced, as manufacturers/suppliers may be confident that important updates reach panels in an accurate and timely fashion. Furthermore, the download of the update may be flexible in nature, as a server may "push" the update to the panel(s) in accordance with a "push" distribution model, or the panel(s) may request the update using a "pull" distribution model. The panel may request the update in response to a user input or command received at the panel that initiates a modification of the panel's configuration.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A system comprising:
   a panel including stored data that is associated with the operation of the panel, wherein the panel is for detecting fire or intrusion; and
   a server including at least one processor and a memory, the server configured to:
      provide a notification to the panel using a short messaging service (SMS) communication, wherein the panel determines that the notification is applicable to an update of the panel's firmware;
      wherein the panel is configured to establish a wireless connection to the server and download a configuration file from the server, wherein the configuration file includes information of at least one update file to be downloaded, wherein the server starts to transmit the update file to the panel, and wherein the panel is configured to re-establish the connection to the server responsive to the connection being lost following a successful download of a first block of the update file, and wherein the panel is configured to resume the download following the re-establishment of the connection starting with a second block that follows the first block, and wherein the panel updates the firmware and performs a restart so that the firmware is programmed automatically by one or more boot up scripts.

2. The system of claim 1, wherein the server is configured to provide the update to the panel using an addressing scheme based on a make or model number of the panel.

3. The system of claim 1, further comprising:
   a second panel remotely located from the panel,
   wherein the server is configured to transmit the update to the panel and the second panel as a broadcast communication comprising an identification of the type of panel that the update is applicable to, and
   wherein the panel is configured to download the update responsive to determining that the update is applicable to the panel based on the identification.

4. The system of claim 1, wherein the configuration file comprises a specification of the type of update, the number of files associated with the update, and the size and hash of each of the files.

5. The system of claim 1, wherein the data comprises at least one of firmware, an application, and an operating system.

6. The system of claim 1, further comprising:
   at least one network communication device configured to communicatively couple the panel and the server.

7. The system of claim 1, further comprising a light weight package management system configured to handle and manage the update.

8. A panel for fire or intrusion detection comprising:
   at least one processor; and
   memory storing instructions that, when executed by the at least one processor, cause the panel to:
      store firmware that is associated with the operation of the panel,
      receive a notification via a short messaging service (SMS) communication that an update to the firmware is available, and wherein the panel determines that the notification is applicable to an update of the firmware, and
      the panel is configured to establish a wireless connection to a server and download a configuration file from the server, wherein the configuration file includes information of at least one update file to be downloaded, wherein the server starts to transmit the update file to the panel, and wherein the panel is configured to re-establish the connection to the server responsive to the connection being lost following a successful download of a first block of the update file, and wherein the panel is configured to resume the download following the re-establishment of the connection starting with a second block that follows the first block, and wherein the panel updates the firmware and performs a restart so that the firmware is programmed automatically by one or more boot up scripts.

9. The panel of claim 8, wherein the panel provides for sound detection and an interactive user interface, and wherein the data is associated with at least one of intrusion detection, fire detection, sound detection, weather information, news, sports, and stocks.

10. The panel of claim 8, wherein the update is received in accordance with a push model, and wherein the instructions, when executed by the at least one processor, cause the panel to:
    receive the notification via a short message service (SMS) communication that the update is available from a server,
    establish a connection to the server responsive to the notification, and download the update via the connection.

11. The panel of claim 8, wherein the update is received responsive to a request transmitted by the panel for the update, and wherein the instructions, when executed by the at least one processor, cause the panel to:
    receive a user input that initiates an update of a configuration of the panel,
    request a connection to a server that stores the update responsive to receiving the user input, and download the update from the server following an establishment of a connection over the second communication network.

12. The panel of claim 8, wherein the instructions, when executed by the at least one processor, cause the panel to: store the update in temporary storage upon receipt, and validate the update by comparing the update to information specified in a configuration file.

13. The panel of claim 12, wherein the instructions, when executed by the at least one processor, cause the panel to: transfer the update from the temporary storage to permanent storage responsive to the validation indicating that the update is successfully received.

14. The panel of claim 8, wherein the update comprises a patch, and wherein the instructions, when executed by the at least one processor, cause the panel to: restart a module associated with the patch upon receipt of the patch.

15. The panel of claim 8, wherein the update comprises a full image, and wherein the instructions, when executed by the at least one processor, cause the panel to: restart upon receipt of the full image.

16. The panel of claim 8, wherein the instructions, when executed by the at least one processor, cause the panel to: receive a predetermined number of voice rings, interpret the voice rings as the notification, and connect to a server over the second communication network to initiate receipt of the update responsive to interpreting the voice rings as the notification.

17. The panel of claim 8, wherein the instructions, when executed by the at least one processor, cause the panel to: validate the update by comparing a computed hash to a downloaded hash, and install the update responsive to said validation indicating a match between the computed hash and the downloaded hash.

18. The panel of claim 17, wherein the installation of the update comprises at least one automated, self-install activity selected from: verifying a version of an existing firmware resource and updating one or more installation plans or scripts, verifying or installing dependencies, creating or replacing a binary file, creating, editing, or replacing a configuration file or other supporting file, executing a script, notifying existing firmware processes running in a system, a cleanup activity, updating a version or restarting a system, process or entity.

19. The panel of claim 8, wherein the received update comprises at least one of:
an update to at least one of a file and a folder, and an update to at least one memory partition image.

20. The panel of claim 8, wherein the received update comprises at least one of:
a removal of a package,
an uninstallation of a package, an upgrade of a package, and
a downgrade of a package.

* * * * *